Patented July 17, 1951

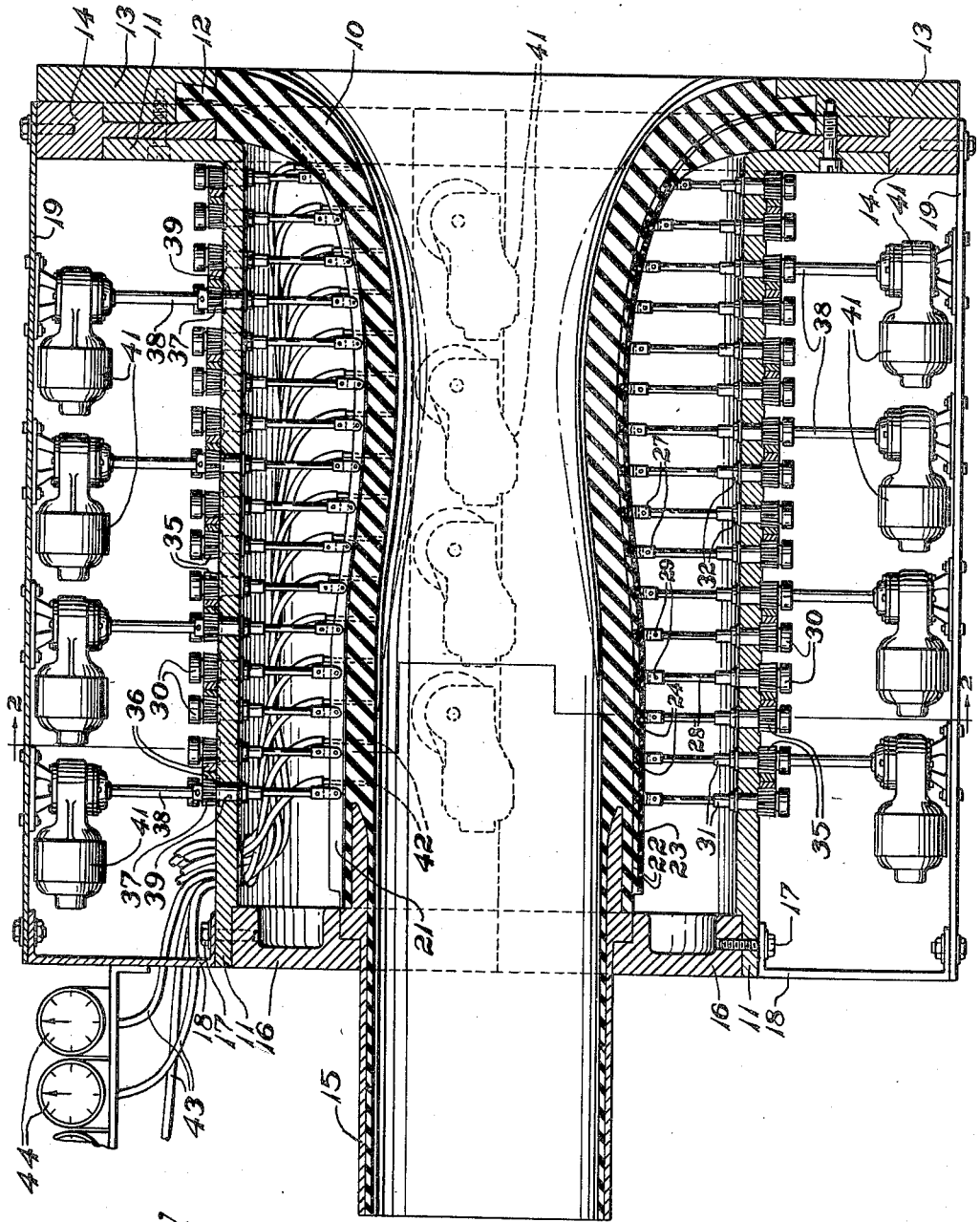

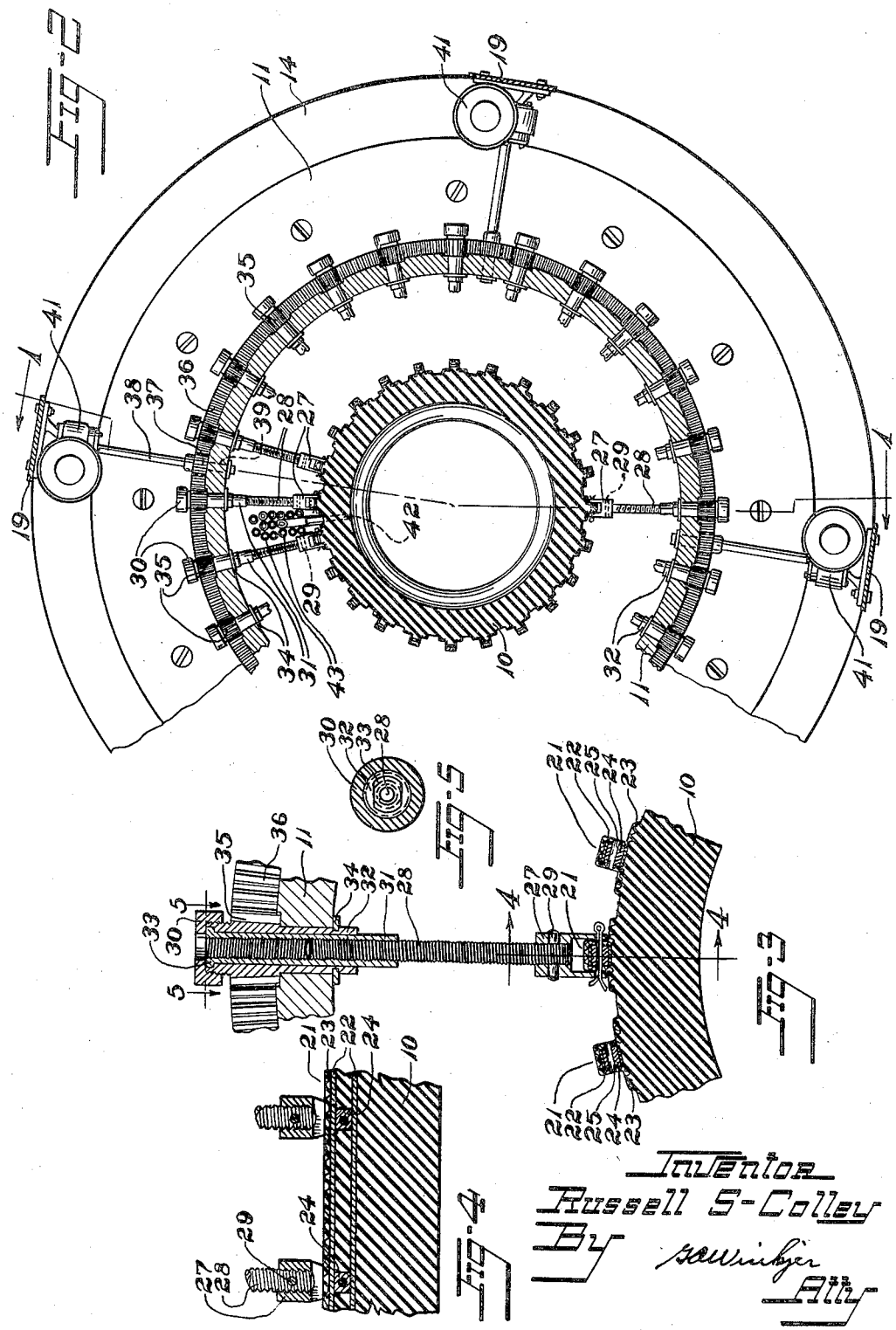

2,560,634

UNITED STATES PATENT OFFICE 2,560,634

ADJUSTABLE FLUID PASSAGE

Russell S. Colley, Kent, Ohio, assignor to The B. F. Goodrich Company, New York, N. Y., a corporation of New York Application September 30, 1946, Serial No. 700,284

16 Claims. (Cl. 138—45)

This invention relates to apparatus for the passage of fluid and especially to Venturi tubes wherein it is desirable to provide means for varying the throat area thereof especially while the venturi is being used. In testing such objects as projectiles and aircraft in wind tunnels where the air velocity approaches and exceeds the speed of sound it is desirable that the Venturi tubes be capable of large as well as fine adjustments of the contour during operation for controlling the air flow. Not only is it desirable to have highly refined adjustments of the venturi for obtaining a variety of Venturi shapes of known characteristics, but provisions for adjustment are also desirable for studying the effects of variations in the shapes upon the flow of air at high velocities.

Objects of the invention are to provide improved regulation of the flow of fluid in a passage, to provide for improved adjustment of the form of the venturi during operation, to provide for facilitating flow of fluid, to provide adjustability of the throat area and form of the entire passage throughout a wide range and to provide for convenience and effectiveness of operation.

Further objects are to provide a Venturi tube with an improved arrangement for adjusting the throat area and contour thereof, and to provide a Venturi tube with refined adjustments for meeting the requirements of wind tunnels where the velocity of the air approaches or exceeds the speed of sound.

These and futher objects will be apparent from the following description, reference being made to the drawings in which:

Fig. 1 is a section in elevation of the apparatus constructed in accordance with and embodying the invention, parts being broken away, the section being taken at a position indicated by the line 1—1 of Fig. 2.

Fig. 2 is a section taken along the line 2—2 of Fig. 1, parts being broken away.

Fig. 3 is a detailed view of the adjusting elements, parts being sectioned and broken away.

Fig. 4 is a section taken along line 4—4 of Fig. 3, parts being broken away.

Fig. 5 is a section taken along line 5—5 of Fig. 3.

With reference to the drawings, a tubular throat lining 10 of resilient material such as rubber or other rubber-like material is mounted in a supporting housing structure such as flanged sleeve 11. One end of the throat lining 10 has a flared portion which has a radially extending tenon 12 which is mounted in a mortise formed by an annular ring member 13 and an interlocking member 14, the latter of which is interposed between the flange of sleeve 11 and the annular ring member. A portion of the lining 10 at the other end is overlapped by a tube 15 which extends into a circumferential axially extending slot in the edge of the lining. The lining 10 may be adhered to the tube 15 as by a vulcanized bond. The tube 15 is mounted in a collar 16 the outer periphery of which abuts the inner surface of the sleeve 11 and is secured to the sleeve 11 by bolts 17 which also fasten radially extending bracket members 18 to the sleeve 11. The bracket members 18 support motor mounting members 19 extending longitudinally of the sleeve 11 and having portions mounted on the interlocking member 14.

The lining 10 has integral projections such as ribs 21 at spaced-apart positions circumferentially of the lining and extending longitudinally of the lining at the outer surface thereof. The ribs 21 have reinforcing members 22, 22 embedded longitudinally in the ribs and reinforcing fabric-like material 23 embedded at the surface of the ribs and overlapping and embedded in the adjacent surface of the lining 10.

Reinforcing blocks 24 are disposed between the reinforcing members 22, 22 at spaced-apart positions longitudinally of the ribs. Additional adherence between the ribs and lining and within the ribs 21 may be attained by bonding the reinforcing material 23 to the ribs and to the overlapped surfaces of the lining 10 and by bonding the reinforcing members 22 to the resilient material of the lining 11 and ribs 21 as by vulcanization. The bonding provides strength of attachment of the ribs 21 to the lining and at the same time provides effective distribution of the stresses imposed upon the ribs over the adjacent portions of the lining 10 to provide a substantially smooth inner surface of the lining 10.

The ribs 21 may have apertures 25 in the reinforcing blocks 24 for receiving cotter pins which pass through apertures in shackles 27 which straddle the ribs for securing the shackles to the ribs. Each shackle 27 is threaded upon a strut-like adjusting element connection such as stud 28 and is prevented from turning on the stud by a pin 29 which passes through apertures in the stud and the shackle. Each stud 28 extends radially from the lining 10 and has a sleeve 31 threaded on the outermost end. The sleeve 31 is mounted in a socket member 32 which is mounted rotatably in an aperture in the flanged sleeve 11. Flanged projections 33 of sleeve 31 fit into slots of socket 32 and are held there by a cap member 30 threaded on the socket thereby preventing relative movement of the sleeve 31 with relation to the socket 32.

A washer 34 mounted on the socket at the inner periphery of the sleeve 11 and a shoulder of the socket at the outer periphery of the sleeve 11 prevent movement of the socket 32 other than rotational movement of the socket 32 relative to the sleeve. The socket 32 extends radially outward from the sleeve 11 and has gear teeth 35 disposed as on a pinion. The sockets 32 may be disposed at spaced-apart positions circumferentially of the sleeve and arranged in sets, each set being disposed in a plane transverse of the axis of the sleeve and parallel to the plane of the other sets forming a series of sets longitudinally of the sleeve as shown in Fig. 1 and Fig. 2.

Ring gears 36 may be mounted slidably about the sleeve member 11 and disposed so that each gear 36 will engage the gear teeth 35 of a set of sockets 32. Each ring gear 36 engages a driving pinion 37 which is mounted on a shaft 38 turning in a bearing 39 mounted in sleeve 11 and turned by a suitable source of power such as motor unit 41. The driving pinions may be disposed at staggered positions circumferentially of the sleeve 11 in a manner such that the motor units 41 may be mounted on the mounting members 19 which are disposed at spaced-apart positions radially outward and circumferentially of the sleeve 11. Static pressure tubes 42 may be mounted in the lining 10 at spaced-apart positions longitudinally of the lining open to the inner wall surface of the lining and connected by flexible tubes 43 to pressure gauges 44 which indicate the pressure in the throat at such position.

In operation, to expand the lining 10 for increasing the throat area motors 41 are actuated to turn shafts 38, and as shown in Fig. 3 to turn shaft 38 in such a direction that the pinion 37 will move the ring gear 36 in a clockwise direction. The ring gear 36 will then turn the socket 32 in a clockwise direction as seen in Fig. 5 causing the threaded sleeve 31 to rotate about the stud 28 and urge the stud radially outward and thereby urge the portion of the lining wall adjacent the stud radially outward.

Each set of sockets 32 which mesh with the ring gears 36 will be turned simultaneously and move the corresponding studs radially outward and thereby uniformly increase the outer periphery of the lining. The ribs are spaced in close proximity to each other and the shackles 27 and studs 28 are disposed in sets at close intervals longitudinally of the sleeve 11. This arrangement in conjunction with the stress-distributing property of the relatively thick radial cross-section of the lining tends to distribute the stresses imposed upon the lining 10 in a manner such that the inner wall of the lining 10 will remain substantially smooth and cylindrical in the adjustment range of the venturi.

The lining 10 in the unstressed condition assumes an inner wall shape as shown in Fig. 1 by dot-dash lines. In use the minimum area at which the venturi is used is that with the lining 10 in tension for obtaining firmness of the wall surface. In Fig. 1 the lining shown in full lines is in a position intermediate the maximum and minimum throat area positions of the venturi.

To reduce the throat area of the lining 10 the shafts 38 are turned in the opposite direction from that used for increasing the throat area and the studs 28 are moved outwardly permitting the resilient material of the lining 10 to move toward the unstressed position and thereby contract the lining.

Each motor unit 41 independently actuates a set of sockets and thereby may move an annular portion of the lining disposed transversely of the axis. In the embodiment of the invention shown in the drawings there are 16 motors arranged in a manner such that 16 adjacent portions of the lining may be adjustably dilated and contracted to obtain a variety of Venturi contours. A greater or smaller number of motor units 41 may be used to obtain a greater or lesser degree of adjustments of the venturi.

The adjustments of the venturi are not objectionably affected by the flow of fluid through the venturi and may be made at any time. It is not necessary to stop the flow of fluid to change the Venturi shape.

Variations may be made without departing from the scope of the invention as it is defined by the following claims.

I claim:

1. A fluid passage comprising a housing structure, a flexible, stretchable, circumferentially continuous lining tube disposed in said structure for use in the stretched condition, a plurality of elements interposed between said structure and said tube, means for mounting said elements on said lining in attached relation thereto and means for moving said elements inward and outward relative to said structure for stretching and flexing said lining to vary the contour thereof.

2. A fluid passage comprising a housing structure, a flexible, stretchable, circumferentially continuous lining tube disposed in said structure, a plurality of elements interposed between said structure and said tube, means for mounting said elements on said tube in attached relation thereto, and means for moving a group of said elements simultaneously relative to said structure for flexing said tube to vary the contour thereof.

3. A fluid passage comprising a supporting structure, a circumferentially continuous lining tube of resilient, stretchable material inside said structure, means for connecting said lining and said structure at a plurality of spaced-apart positions circumferentially and longitudinally of the lining tube and means for adjusting said first-mentioned means to vary the contour of said lining tube.

4. A fluid passage comprising a supporting structure, a circumferentially continuous lining tube of resilient, stretchable material inside said structure, connections between said structure and said lining, said connections being disposed in a series of sets at spaced-apart positions longitudinally of said lining tube, the connections of said sets including means for adjusting the same simultaneously for adjusting each set independently of the other of said sets to change the area of the interior cross-section of said lining.

5. A fluid passage comprising a supporting structure, a circumferentially continuous lining tube of resilient, stretchable material inside said structure, connections between said structure and said lining tube, said connections being disposed in a series of sets at spaced-apart positions longitudinally of said lining tube, the connections of each set being disposed at spaced-apart positions circumferentially of said lining tube, said sets including means for adjustably flexing said lining to vary the contour of the passage.

6. A fluid passage comprising a supporting structure, a circumferentially continuous lining tube of resilient, stretchable material inside said structure, means connecting said lining and said structure at a plurality of spaced-apart positions circumferentially and longitudinally of said lining tube, and means for moving a portion of said lining away from an opposite portion of the passage to vary the contour of said lining tube.

7. A fluid passage comprising a supporting structure, a circumferentially continuous lining tube of resilient, stretchable material inside said structure, connections between said structure and said lining, said connections being disposed in a series of sets at spaced-apart positions longitudinally of said lining tube, the connections of each said sets including means for adjusting the same simultaneously and for adjusting each set independently of the other of said sets to distend and urge a portion of said lining away from an opposite portion of said lining to change the interior cross-sectional area of said lining tube.

8. A fluid passage comprising a housing structure, a lining tube of resilient material inside said structure, means supporting said lining tube interposed between said structure and said tube comprising connections between said tube and said structure at spaced-apart positions along and about said tube, including means for adjusting said connections to urge a portion of said tube at the outer surface thereof away from an opposite portion of said tube by distension of said tube, said tube being of substantial thickness such that a substantial smooth interior surface is maintained despite the connections at spaced-apart positions along the outer surface thereof.

9. A fluid passage comprising a sleeve, a flexible lining disposed in said sleeve, a plurality of elements interposed between said sleeve and said lining, said lining comprising a resilient, rubber-like tube, a projection extending radially from the outer circumference of said lining, a reinforcing member embedded in said projection, reinforcing fabric-like material embedded in said projection, said projection having apertures therein, means for mounting said elements on said projection including an element disposed in said apertures and means for moving each said element relative to said sleeve to change the contour of said lining.

10. A fluid passage comprising a sleeve, a flexible lining disposed in said sleeve, a plurality of studs interposed between said sleeve and said lining, means for mounting said studs on said lining, means for moving a group of said studs simultaneously relative to said sleeve to change the contour of said lining, the moving means comprising sockets threaded on each said stud and rotatably mounted in said sleeve for turning movement, pinion members mounted on each of said sockets, a ring gear mounted rotatably about said sleeve and engaging said pinions to turn them simultaneously when said ring gear is turned about said sleeve.

11. A fluid passage comprising a sleeve, a flexible lining disposed in said sleeve and mounted on said sleeve at the edges, a plurality of studs interposed between said sleeve and said lining, said lining comprising a resilient tube of rubber-like material, projections extending radially from the outer circumference of said lining, reinforcing members embedded in said projections, reinforcing fabric-like material embedded in and at the outer surface of said projections, said projections having apertures therein, means for mounting said studs on said projections including elements in said apertures, means for moving each said stud relative to said sleeve to change the contour of said lining comprising sockets threaded on each said stud and rotatably mounted in said sleeve for turning movement, pinion members mounted on each said socket and ring gears mounted rotatably about said sleeve and engaging said pinions to turn them when said ring gears are turned about said sleeve.

12. A fluid passage comprising a housing structure, a flexible, stretchable, circumferentially continuous lining tube disposed in said structure for use in the stretched condition, a plurality of elements interposed between said structure and said tube, means for mounting said elements on said lining in attached relation thereto and means for moving said elements inward and outward relative to said structure for stretching said lining tube and adjusting the contour thereof, said elements comprising struts to maintain the adjusted contour of said tube despite fluid forces upon the tube.

13. A fluid passage comprising a housing structure, a lining tube of resilient material inside said structure, means supporting said lining tube interposed between said structure and said tube comprising connections between said tube and said structure at spaced-apart positions along and about said tube, including means for adjusting said connections to urge portions of said tube at the outer surface thereof away from opposite portions of said tube by distension of said tube, said tube being of substantial thickness such that a substantially smooth interior surface is maintained despite the connections at spaced-apart positions along the outer surface thereof, said connections comprising struts to maintain the adjusted position of said tube despite fluid forces upon the tube.

14. A fluid passage comprising a supporting structure, a wall of resilient material inside said structure for use in the stretched condition, a plurality of elements interposed between said structure and said wall, said elements being attached to said wall at a plurality of spaced-apart positions, and means for adjusting said elements inward and outward to stretch and vary the contour of said wall.

15. A fluid passage comprising a supporting structure, a wall of resilient material inside said structure for use in the stretched condition, a plurality of elements interposed between said structure and said wall, said elements being attached to said wall at a plurality of spaced-apart positions circumferentially and longitudinally of the passage and means for adjusting said elements inward and outward to stretch and vary the contour of said wall.

16. A fluid passage comprising a supporting structure, a wall of resilient material inside said structure, a plurality of elements interposed between said structure and said wall, said elements being attached to said wall in a series of sets at spaced-apart positions longitudinally of said passage, and means for adjusting the elements of one set simultaneously and for adjusting each set independently of the other of said sets to vary the contour of said wall and the cross-sectional area of the fluid passage.

RUSSELL S. COLLEY.

REFERENCES CITED

The following references are of record in the file of this patent:

UNITED STATES PATENTS

| Number | Name | Date |
|---|---|---|
| 2,241,086 | Gould | May 6, 1941 |
| 2,253,586 | Serkau | Aug. 26, 1941 |
| 2,424,654 | Gamble | July 29, 1947 |
| 2,434,835 | Colley | Jan. 20, 1948 |